United States Patent [19]
Tokunaga

[11] Patent Number: 5,111,535
[45] Date of Patent: May 5, 1992

[54] METHOD AND SYSTEM FOR SWITCHING RADIO FREQUENCY

[75] Inventor: Koji Tokunaga, Tokyo, Japan

[73] Assignee: NEC Corporation, Tokyo, Japan

[21] Appl. No.: 314,746

[22] Filed: Feb. 24, 1989

[30] Foreign Application Priority Data

Feb. 25, 1988 [JP] Japan .................................. 63-40700

[51] Int. Cl.⁵ ............................................. H04Q 7/00
[52] U.S. Cl. ..................................... 455/33.2; 379/60
[58] Field of Search ................. 455/54, 59, 33, 34, 455/56; 370/69.1, 124, 76, 120; 379/59, 60, 63

[56] References Cited

U.S. PATENT DOCUMENTS

| | | | |
|---|---|---|---|
| 4,545,071 | 10/1985 | Freeburg . | |
| 4,697,260 | 9/1987 | Gravel et al. | 455/33 |
| 4,723,266 | 2/1988 | Perry | 379/60 |
| 4,765,753 | 8/1988 | Schmidt | 455/33 |
| 4,887,265 | 12/1989 | Felix | 455/54 |
| 4,955,082 | 9/1990 | Hattori et al. | 455/33 |

*Primary Examiner*—Curtis Kuntz
*Attorney, Agent, or Firm*—Sughrue, Mion, Zinn, Macpeak & Seas

[57] ABSTRACT

In a method and system in which data is time-divisionally transmitted from a plurality of base stations to a plurality of mobile subscribers at different frequencies corresponding to the base stations, a given mobile subscriber switches a reception frequency during a time period in which no data originating to the given mobile subscriber is transmitted from the base station having a frequency presently used by the given mobile subscriber, and tests a reception condition at the switched frequency so as to select an optimal reception frequency.

6 Claims, 4 Drawing Sheets

METHOD AND SYSTEM FOR SWITCHING RADIO FREQUENCY

BACKGROUND OF THE INVENTION

The present invention relates to a method and system for switching a radio frequency and, more particularly, to a method for, in a system for transmitting data from a plurality of radio stations (to be referred to as base stations) to a plurality of moving stations (to be referred to as mobile subscribers), switching from a frequency of the base station presently used by a given mobile subscriber to a frequency of another base station in a better reception condition.

In a conventional radio frequency switching method of this type, present reception of a radio wave from a given base station is interrupted, a reception frequency is switched to another frequency, and a reception condition at the switched frequency is tested. Thus, the frequency is switched to that of a base station in a better reception condition.

In the conventional frequency switching method described above, in order to determine an optimal frequency, present reception of a radio wave from a given base station must be interrupted. Thus, even if data is kept transmitted at the frequency of the given base station, this data cannot be received while another frequency is being received.

SUMMARY OF THE INVENTION

It is a principal object of the present invention to provide a method and system for switching a radio frequency, wherein a reception frequency can be switched to a frequency of a base station allowing optimal reception without failing to receive data from a base station used so far to a self station (mobile subscriber), in order to allow a mobile subscriber to optimally receive data.

According to an aspect of the present invention, there is provided, in a system in which data is time-divisionally transmitted from a plurality of base stations to a plurality of mobile subscribers at different frequencies corresponding to the base stations, a radio frequency switching method wherein a given mobile subscriber switches a reception frequency during a time period in which no data originating to the given mobile subscriber is transmitted from the base station having a frequency presently used by the given mobile subscriber, and tests a reception condition at the switched frequency so as to select an optimal reception frequency.

According to another aspect of the present invention, there is provided, in a system in which data is time-divisionally transmitted from a plurality of base stations to a plurality of mobile subscribers at different frequencies corresponding to the base stations, a radio frequency switching system wherein a format of a signal transmitted from each of the base stations includes normal processing data for identifying the mobile subscribers and next signaling time information indicating a time period until next data is transmitted, and each of the mobile subscribers comprises means for setting, based on the next signaling time information included in the transmitted from the base station, a time until the next data is received, means for discriminating a base station corresponding to a highest reception electric field within the set time, and switching request means for transmitting a request for switching a reception frequency to that of the discriminated frequency to the discriminated base station corresponding to the highest electric field.

DESCRIPTION OF THE PREFERRED EMBODIMENT

An embodiment of the present invention will now be described with reference to the accompanying drawings.

Figure 1A:
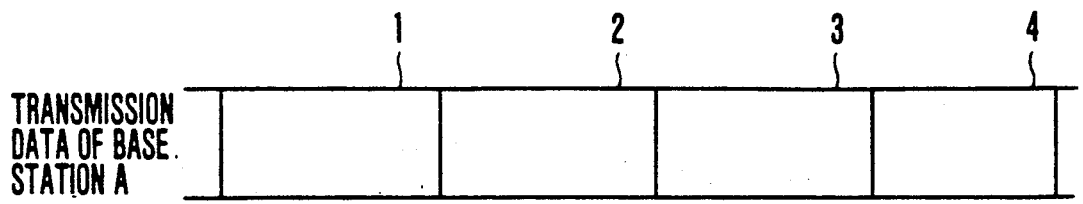
FIGS. 1A and 1B are a timing chart for explaining a radio frequency switching method according to an embodiment of the present invention.
Figure 1B:
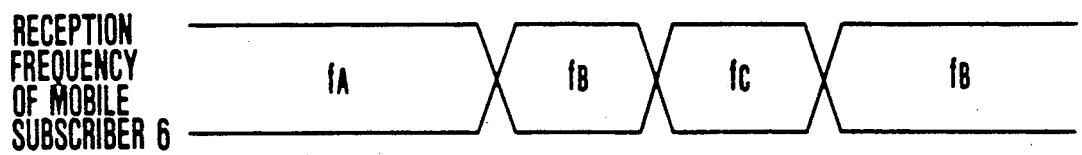
Figure 2:
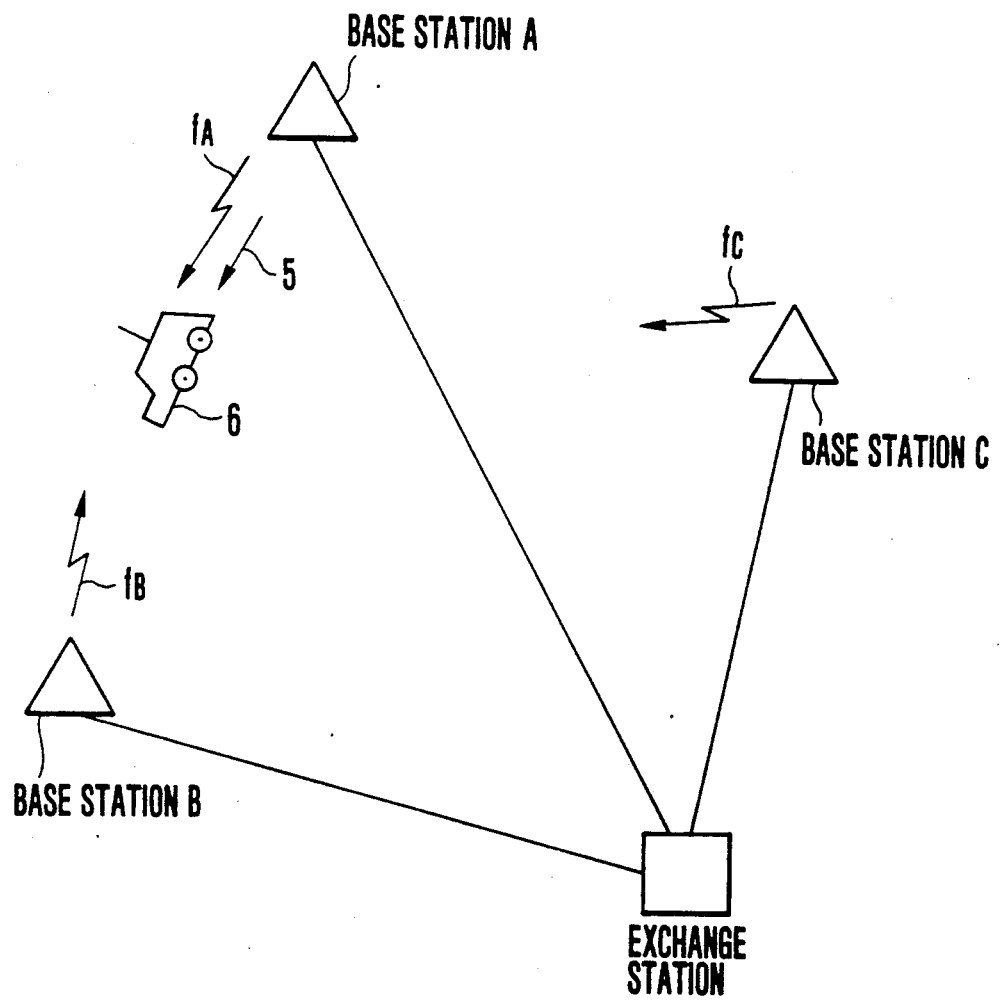
FIG. 2 is a schematic diagram of a system to which the present invention is applied.

Referring to FIGS. 1 and 2, reference symbols A, B, and C denote base stations. The base stations A, B and C time-divisionally transmit data to a plurality of mobile subscribers 6 (only one is illustrated) at different radio frequencies $f_A$, $f_B$, and $f_C$. When data to be transmitted is divided along a time base, a unit of each divided data will be referred to as a packet, and a unit of each divided time will be referred to as a slot.

The base stations A, B, and C of this embodiment add, to each packet, time information until a slot to be received next. Thus, when each mobile subscriber 6 receives a packet including data originating to the self station, it can recognize a time period until a slot to be received next.

The mobile subscriber 6 switches a reception frequency to another frequency until the slot to be received next, and tests and stores a reception condition at the switched frequency. When the mobile subscriber switches a reception frequency, it selects an optimal frequency according to the stored condition.

A case will be briefly described below wherein a reception frequency of the mobile subscriber 6 is switched from the frequency of the base station A to the frequency of the base station B.

The mobile subscriber 6 presently receives the frequency $f_A$ of the base station A. However, since the mobile subscriber 6 is moved away from the base station A along a moving direction 5, as shown in FIG. 2, it tests reception conditions of radio waves from the other base stations B and C, and must switch the reception frequency to that of the optimal base station.

The base station A transmits data to the mobile subscriber 6 in a packet, as shown in FIG. 1. The packet in a slot 1 includes time information until a slot 3 to be received next.

The mobile subscriber 6 receives data in the slot 1, and hence, receives time information until the slot 3. In a time period until the slot 3, i.e., in a slot 2, the mobile subscriber 6 switches a reception frequency to the frequency $f_B$ of the base station B and tests the reception condition at the switched frequency, similarly tests the reception condition at the frequency of the base station B, and stores these test results. Since the mobile subscriber 6 is moving toward the base station B, the test result of the reception condition from the base station B is better.

The mobile subscriber 6 then switches the reception frequency to the frequency $f_A$ to receive the slot 3, and thereafter, switches the reception frequency to the optimal frequency $f_B$ in accordance with the test result.

The radio frequency switching method of the present invention will be described in detail with reference to FIGS. 3A to 5.

Figure 3A:
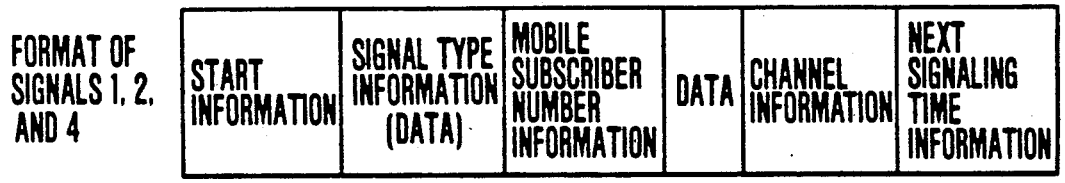
FIGS. 3A and 3B show signal formats used in the method according to the embodiment of the present invention.
Figure 3B:
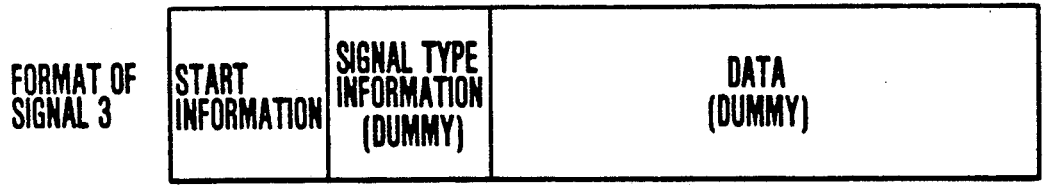

FIGS. 3A and 3B show signal formats according to the embodiment of the present invention. FIG. 3A shows a signal format of each of the packets 1, 2, and 4 of a signal transmitted from the base station A, and FIG. 3B shows a signal format of the packet 3. In FIGS. 3A and 3B, start information represents the start of a packet. Signal type information represents whether a signal of the corresponding packet is data or dummy. Mobile subscriber number information represents a number of a mobile subscriber which should receive the corresponding data. Data is one transmitted from the base station to the corresponding mobile subscriber. Channel information represents a frequency of a base station with which the corresponding mobile subscriber compares an electric field. Next signaling time information represents a time period until data is transmitted to the same mobile subscriber number as in this packet. The packet 2 is data to a mobile subscriber number different from that of the packet 1. The packet 3 is a dummy packet. When the number of mobile subscribers to which a given base station transmits data is small, if data is transmitted to the mobile subscribers successively or in a short period, a time in which the mobile subscriber measures an electric field is shortened or becomes insufficient. Therefore, the base station inserts the dummy data to prolong a time period until data is transmitted to the same mobile subscriber number. The dummy data is ignored at all the mobile subscribers. In FIG. 1, the base station A inserts the dummy packet as the packet 3 so as to form a time period corresponding to two slots, so that the packets 1 and 2 are separated at a 2-slot time interval. During this time interval, the mobile subscriber 6 measures the electric fields of the frequencies $f_B$ and $f_C$. A base station which does not transmit data to a mobile subscriber transmits the dummy data, so that a mobile subscriber which receives data from another base station can measure an electric field.

Figure 4:
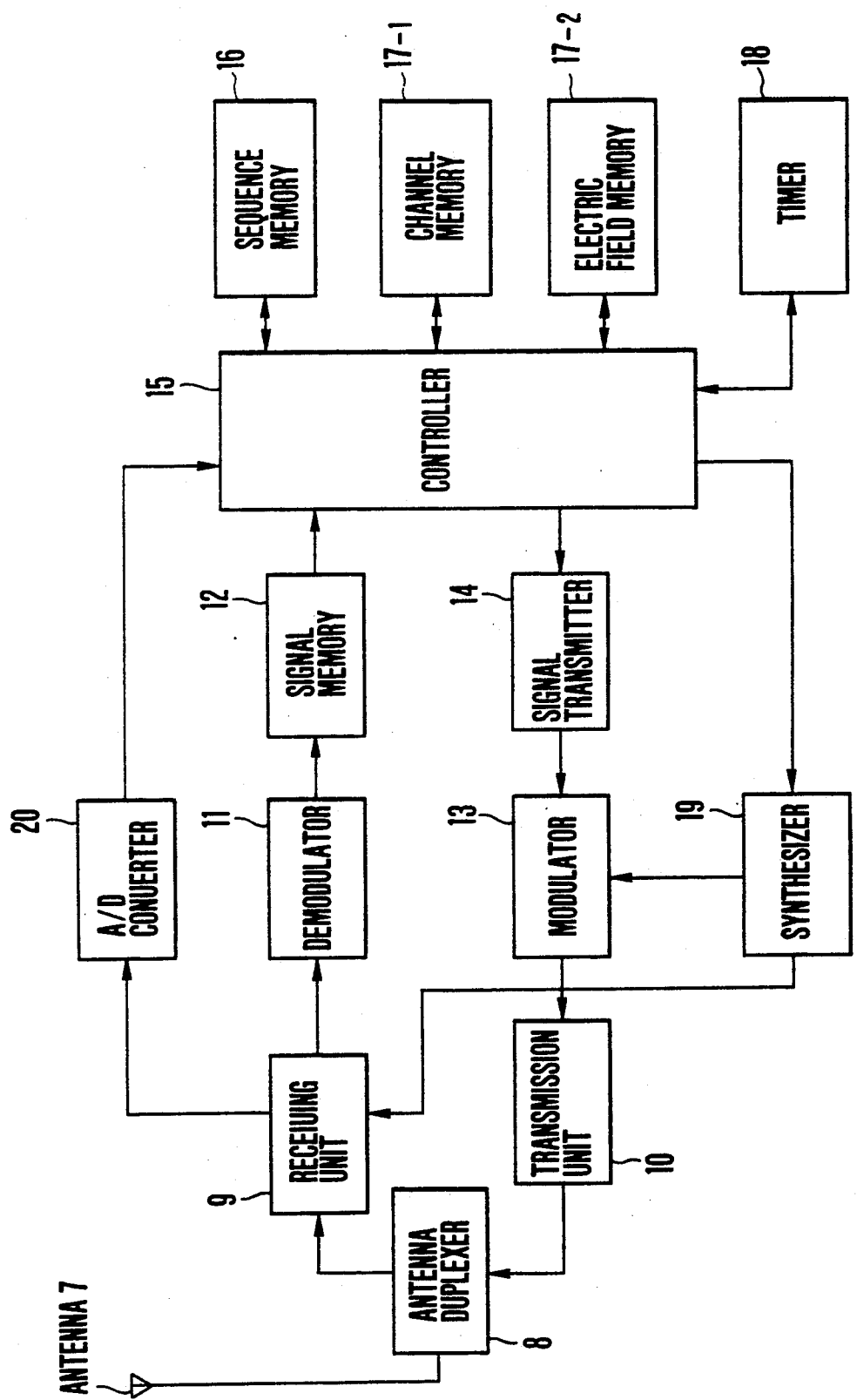
FIG. 4 is a block diagram of a mobile subscriber according to the embodiment of the present invention.

FIG. 4 is a block diagram of a mobile subscriber according to the embodiment of the present invention. In FIG. 4, an antenna 7 is connected to a receiving unit 9 and a transmission unit 10 through an antenna duplexer 8. A radio wave received by the receiving unit 9 is demodulated to a signal by a demodulator 11, and the demodulated signal is stored in a signal memory 12. A controller 15 decodes the received signal stored in the signal memory 12 in accordance with a sequence stored in a sequence memory 16, and causes a channel memory 17-1 to store a frequency of another base station read from channel information. An A/D converter 20 receives a reception electric field as a voltage from the receiving unit 9, and converts the received voltage into digital data which can be read by the controller 15.

When signal reception at the self station is completed, the controller 15 reads a time period until the next signal arrives at the self station on the basis of the next signaling time information, and sets a timer 18 excluding a frequency switching time for receiving data again. The controller 15 causes the channel memory 17-1 to store a frequency received so far, and causes an electric field memory 17-2 to store a reception electric field as electric field information. The controller 15 then fetches a frequency of another base station from the channel memory 17-1, and controls a synthesizer 19 to switch the frequency. The controller 15 then fetches the reception electric field of the receiving unit 9 through the A/D converter 20, and causes the electric field memory 17-2 to store it as electric field information in correspondence with the frequency. The controller 15 sequentially switches the frequencies in accordance with the frequencies stored in the channel memory 17-1, and causes the electric field memory 17-2 to sequentially store the corresponding electric fields. When the timer 18 is time-out or the electric fields of all the frequencies stored in the channel memory 17-1 are measured, the controller 15 fetches the electric field information from the electric field memory 17-2 to find a frequency having the highest reception electric field, and controls the synthesizer 19 to switch the reception frequency to the found frequency. If the frequency corresponding to the highest reception electric field is different from the frequency at which data is received so far, the controller 15 writes a signal requesting switching of the base station in a signal transmitter 14. The signal transmitter 14 sends a switching request signal to a modulator 13, and the modulator 13 modulates a radio wave from the synthesizer 19 and sends the modulated wave to the transmission unit 10. The transmission unit 10 transmits the radio wave to the corresponding base station through the antenna duplexer 8 and the antenna 7. Thereafter, the mobile subscriber waits for data sent from a new base station.

Figure 5:
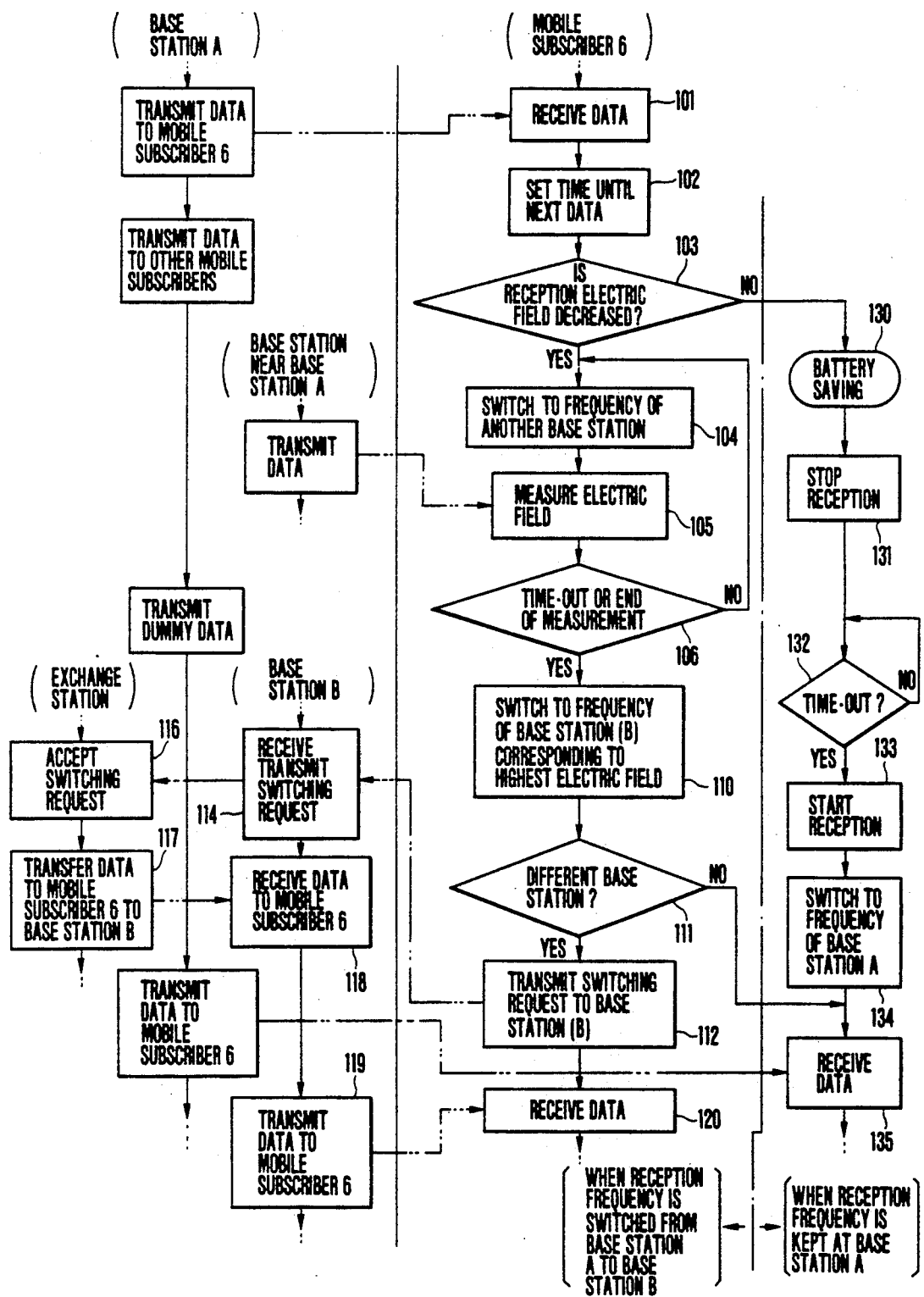
FIG. 5 is a flow chart for explaining the embodiment of the radio frequency switching method of the present invention.

FIG. 5 is a flow chart for explaining an operation of the radio frequency switching method according to the embodiment of the present invention.

Assume that the base station A transmits data at a timing illustrated in FIG. 1.

When the mobile subscriber 6 receives data transmitted from the base station A in step 101, the controller of the mobile subscriber 6 reads a time until the next data from the next signaling time information in the received data, and sets the read time excluding a frequency switching time for receiving data again, in step 102. In step 103, the controller checks whether or not a reception electric field is decreased. If it is determined in step 103 that the reception electric field is lower than a predetermined value, i.e., "YES" is obtained in step 103, the controller sequentially switches a reception frequency to frequencies of other base stations read from the channel information in the reception data in step 104, and measures electric fields until the timer is time-out, in step 105. If it is determined in step 106 that the timer is time-out or the electric fields of all the frequencies are measured, the controller switches a reception frequency to a frequency corresponding to the highest electric field of the base station (B in this embodiment) in step 110. In step 111, the controller checks if the switched frequency is different from one before switching. If YES in step 111, the flow advances to step 112, and the controller sends a switching request to the base station B. Thereafter, the controller waits for data sent from the base station B. The base station B which receives the switching request in step 112 sends a switching request to an exchange station (step 114). The exchange station receives the switching request in step 116, and transfers data, sent to the mobile subscriber 6, from the base station A to the base station B in step 117. The base station B receives data to the mobile subscriber 6 from the exchange station in step 118, and starts transmission of data to the mobile subscriber, in step 119. In step 120, the mobile subscriber receives data from the base station B.

If it is determined in step 103 that the reception electric field is higher than a predetermined value, i.e., "NO" is obtained in step 103, a battery saving operation is performed in step 130, and the reception operation is stopped in step 131. If the timer is time-out in step 132, the controller starts reception in step 133, switches a reception frequency to the frequency of the base station A in step 134, and receives data in step 135.

If it is determined in step 111 that the base station remains the same, the flow advances to step 135, and data is received.

In the above embodiment, data indicating a time until the next data is transmitted is added to data transmitted to the mobile subscriber. However, a packet to be received is transmitted in predetermined cycles, so that the mobile subscriber can recognize a time until the next slot to be received.

According to the present invention as described above, a reception condition of another frequency is tested while data originating to a self station is not transmitted, so that an optimal frequency can be selected without failing to receive data.

What is claimed is:

1. A system having a plurality of base stations and a plurality of mobile stations, each of said base stations comprising:
means for time-divisionally transmitting data at a frequency assigned thereto, different frequencies being assigned to said base stations, respectively, said data including first information identifying one of said mobile stations and second information indicating a time of which a next data transmission to be received by the identified mobile stations starts, each of said mobile stations comprising:
means for receiving data transmitted from other base stations;
means for measuring the reception electric field of said given and other base stations to select among said given and other base stations a base station transmitting the highest electric field; and
switching request means for transmitting a switching request to the selected base station, so that the reception frequency of the mobile station is switched to a frequency assigned to said selected base station.

2. A system according to claim 1, wherein said switching request means transmits the switching request only when the discriminated base station corresponding the highest electric field is not busy.

3. A method of switching a first frequency of a mobile subscriber unit to another frequency, comprising the following steps:
time-divisionally transmitting data from a plurality of base stations at a plurality of different frequencies, respectively, said plurality of frequencies corresponding to said plurality of base stations, respectively, and including said first frequency;
changing said first frequency of said mobile subscriber unit to other frequencies during a time period in which no data is addressed to said mobile subscriber unit;
measuring at said mobile subscriber unit the reception conditions of said first and other frequencies to produce measured reception conditions, respectively; and
based on said measured reception conditions, selecting an optimal frequency among said first and other frequencies in order to switch said first frequency of said mobile subscriber unit to said optimal frequency.

4. A method according to claim 3 wherein a packet of data transmitted from each of said base stations to the given mobile subscriber includes next signaling time information indicating a time period until next data is transmitted in addition to normal processing data, and the mobile subscriber unit tests the reception condition in a time defined by the next signaling time information.

5. A system in which data is time-divisionally transmitted from a plurality of base stations to a plurality of mobile subscribers at different frequencies corresponding to said base stations, wherein each of said mobile subscribers comprises:
monitor means for determining when data is not transmitted from the base station;
discriminating means for discriminating a base station corresponding to the highest reception electric field when said monitoring means determines that no data is transmitted; and
means for transmitting a request for switching a reception frequency to that of the discriminated frequency to the discriminated base station.

6. A system according to claim 5, wherein a format of a signal transmitted from each of said base stations includes normal processing data for identifying the mobile subscribers and next signaling time information indicating a time period until a next data transmission, said monitor means of each of said mobile subscribers includes means for setting, based on the next signaling time information included in the signal transmitted from the base station, a time until the next data is received, and said discriminating means discriminates which base station corresponds to the highest electric field in the set time.

* * * * *